United States Patent [19]

Benker et al.

[11] Patent Number: 4,957,811

[45] Date of Patent: Sep. 18, 1990

[54] COMPONENTS OF SILICON-INFILTRATED SILICON CARBIDE HAVING A POROUS SURFACE, AND PROCESS FOR THE PRODUCTION THEREOF

[75] Inventors: Werner Benker, Selb; Gert Lindemann, Lichtenstein; Jürgen Heinrich, Selb, all of Fed. Rep. of Germany

[73] Assignee: Hoechst CeramTec Aktiengesellschaft, Selb, Fed. Rep. of Germany

[21] Appl. No.: 415,560

[22] Filed: Sep. 26, 1989

[30] Foreign Application Priority Data

Sep. 28, 1988 [DE] Fed. Rep. of Germany ....... 3832876

[51] Int. Cl.$^5$ .......................... B32B 9/00; B32B 5/14; C01B 31/36
[52] U.S. Cl. .................................. 428/312.6; 423/345; 427/243; 427/244; 427/299; 428/318.6; 428/408; 428/446
[58] Field of Search ................ 423/345; 427/243, 244, 427/299; 428/408, 446, 312.6, 318.6

[56] References Cited

U.S. PATENT DOCUMENTS

| | | | |
|---|---|---|---|
| 4,221,831 | 9/1980 | Kostikov et al. | 427/314 |
| 4,299,881 | 11/1981 | Luhleich et al. | 428/408 |
| 4,429,003 | 1/1984 | Fredriksson et al. | 428/408 |

FOREIGN PATENT DOCUMENTS

| | | |
|---|---|---|
| 2834315 | 3/1979 | Fed. Rep. of Germany . |
| 2838333 | 3/1980 | Fed. Rep. of Germany . |

OTHER PUBLICATIONS

Rosbenblatt, "Siliciumcarbid/Graphit–Verbundwerkstoffe", Sprechsaal, vol. 113, Issue 11/80; pp. 866–870.

*Primary Examiner*—William J. Van Balen
*Attorney, Agent, or Firm*—Foley & Lardner, Schwartz, Jeffery, Schwaab, Mack, Blumenthal & Evans

[57] ABSTRACT

For producing a component of silicon-infiltrated silicon carbide, having a porous sliding surface, a component of silicon-infiltrated silicon carbide (composition: 40–95% by weight of SiC, 1–45% by weight of carbon particles of grain size 0.1 to 500 $\mu$m and 1–25% by weight of silicon) is machined on parts of the surface, a sliding surface thus being produced. The resulting component is heated in an oxygen-containing atmosphere at temperatures from 700° to 1410° C. until the carbon particles present in the sliding surface have been at least partially oxidized with the formation of pores.

8 Claims, No Drawings

COMPONENTS OF SILICON-INFILTRATED SILICON CARBIDE HAVING A POROUS SURFACE, AND PROCESS FOR THE PRODUCTION THEREOF

The invention relates to components of silicon-infiltrated silicon carbide which additionally also contains finely disperse carbon particles. Silicon-infiltrated silicon carbide without carbon can, inter alia, be used for producing piston rings and piston skirts for pistons of internal combustion engines. The high hardness and the high thermal conductivity of silicon carbide are advantageous in this case. According to European patent application No. 092,716, sliding rings and sliding bodies can also be produced from silicon-infiltrated silicon carbide.

Moreover, sliding materials are known which simultaneously contain silicon carbide and major quantities of graphite.

According to the process of German Pat. No. 2,834,315, a semifinished carbon product is impregnated at not less than 2100° C. with molten silicon. In this case, the pores are first filled with silicon which is subsequently converted into silicon carbide. The material obtained is said to have a dense graphite/carbide structure with a uniform phase distribution and to be very suitable for the production of sliding bodies. This literature reference does not contain any data on the grain size of the carbon particles present and on the quantities of free silicon.

Analogously, by impregnation of electrographites of high porosity with a less than equivalent quantity of liquid silicon, a composite material can be obtained which is composed of approximately equal proportions of β-SiC and graphite and has good sliding properties (Ulf Rosenblatt, S+E - Report No. 30 and Sprechsaal, volume 113, issue 11/18, page 866, and also German Offenlegungsschrift No. 2,838,333). The graphite phase slowly burns out already at temperatures above 600° C.

In the manufacture of these products, the starting material is free of silicon carbide. Rather, the latter is formed exclusively by reaction of silicon with excess carbon.

The object was therefore to improve further the sliding properties or the emergency running properties of components of infiltrated silicon carbide, so that no seizing occurs on the sliding surfaces when lubricant is lacking.

The invention is based on the finding that, in the sliding surface of an SiSiC body, which still contains free carbon particles, a pore structure can be produced in a controlled manner at high temperatures by reaction with oxygen. The pores produced in this way improve the supply of lubricant to the sliding surface.

A process for producing a component, having a porous sliding surface, from silicon-infiltrated silicon carbide has now been found, which comprises machining a component of silicon-infiltrated silicon carbide with
  40–95% by weight of SiC,
  1–45% by weight of carbon particles of grain size 0.1–500 μm and
  1–25% by weight of silicon
on parts of the surface and thus producing a sliding surface, and heating the resulting component in an oxygen-containing atmosphere at temperatures from 700° to 1410° C. until the carbon particles present in the sliding surface have been at least partially oxidized with the formation of pores.

When the component employed according to the invention is heat-treated in an oxygen-containing atmosphere, the superficially exposed carbon burns off. It then leaves pores, whose number in the sliding surface is determined by the quantity and whose diameter is determined by the grain size of the C particles in the C/SiSiC body used. The upper limit of the reaction temperature is given by the melting point of silicon. If the silicon phase were to melt, the dimensional stability of the treated component would suffer and undesired porous regions can be formed in the interior of the component. At reaction temperatures below 700° C., the reaction of the exposed carbon particles with oxygen proceeds uneconomically slowly. An increase in temperature and in the oxygen content of the gas phase shortens the treatment time. Pure oxygen has the most vigorous action. However, gases of only small $O_2$ content, for example air, can also be used. Heavy metal salts appear to accelerate the oxidation. Noticeable pore formation takes about 2 hours with air at 700° C. and about 1 hour with pure oxygen at 1400° C. A minimum reaction time of 2 hours is preferred. The removal of large (and therefore thick) carbon particles takes longer than the removal of smaller particles. Carbon particles in the interior of the component are not attacked by the treatment with oxygen.

It is surprising that the surface of the component is not destroyed by the treatment with oxygen and, especially, that the sliding properties of the heated surface are not adversely affected by burning out the graphite.

The heat treatment can already be stopped when the carbon particles still present after the silicization have been only partially oxidized. It is preferred, however, to continue the treatment with oxygen until the carbon present on the sliding surface has been completely oxidized.

A possible way of producing a component from silicon-infiltrated silicon carbide and incorporated carbon particles comprises forming a mixture of
  30 to 87% by weight of silicon carbide powder having a grain size distribution between 1 and 100 μm,
  0 to 10% by weight of carbon having a grain size distribution between 0.5 and 10 μm,
  5 to 50% by weight of carbon having a grain size between 60 and 560 μm and
  5 to 15% by weight of an organic binder
into a blank, carbonizing the organic binder in a nonoxidizing oxidizing atmosphere and then silicizing the blank between 1420° and 1700° C., a component of silicon-infiltrated silicon carbide being obtained. A similar process for producing bodies from SiSiC with carbon inclusions is indicated in German Offenlegungsschrift No. 3,431,828. It is preferred for the organic binder to have a high carbonization residue. Aromatic resins having a carbonization residue of at least 30% of carbon are preferred. The resins used can, for example, be novolaks or phenol/formaldehyde condensation products (carbonization residue about 50% of carbon) which can be dissolved in an organic liquid, such as methanol, isopropanol and acetone, for the production of compressed granules. This solution is then intensively mixed with the solid components and then dried. By means of sieving at a mesh width below 0.6 mm, compressible granules can be produced in this way. Polyphenylene has a carbonization residue of about 90% by weight of carbon.

A similar process which, however, leads to bodies without carbon inclusions, is known from German Pat. No. 3,116,786. In the present process, the density of the carbonized body can assume lower values and the proportion of carbon in the carbonized body can assume higher values.

The smaller the carbon particles (having a grain size below 10 μm), the more difficult they are to compact. Thus, only a low green density is reached as a rule at the same pressing force, when very fine carbon is used.

This is a disadvantage, because the proportion of carbon must be increased in order to obtain the same final densities.

The fine carbon particles and the carbonized binder are completely converted into SiC during the silicization. By contrast, the coarse carbon particles (having a minimum size of 50 μm) are only incompletely converted to silicon carbide, since a skin of silicon carbide is formed which makes further penetration of the silicon more difficult. Complete conversion to SiC therefore proceeds only slowly, even in the presence of molten silicon. The larger the carbon particles employed, the smaller the proportion by weight, relative to the carbon content, which is converted to SiC and the larger the pores or the surface later become. At the same proportion by weight of carbon particles employed, the proportion of area or volume of the pores in the surface increases in the case of larger particles. The narrower the grain size distribution spectrum of the coarse carbon particles employed, the more uniform the size distribution of the pores which can be produced in the sliding surface. In the case of short duration of the silicization, the diameter of a carbon particle decreases by about 50 μm during the silicization. Since the carbon particles in the molding represent only the residues of larger particles, the proportion by weight of very small particles (less than 2 μm) in the body can disregarded. To produce pores which have a positive effect on the sliding properties, carbon particles of 50–500 μm in the component are preferred.

The machining of the moldings preferably takes place only after carbonization, because the machining tools are then not clogged and the strength of the moldings is better. For producing the sliding surface after silicization and before the oxygen treatment, a second (fine) machining is necessary, for example by grinding, lapping or polishing with diamond tools. The carbonized body is composed of 30 to 90% by weight of silicon carbide and 10 to 70% by weight of carbon.

The molding can be carried out in the case of simple bodies by molding and, in the case of complicated components, by machining an isostatically pressed or dry-pressed blank. The carbonization, i.e. the conversion of the carbonaceous binder to carbon, takes place with exclusion of air, for example in an argon or nitrogen atmosphere, by heating at a heating rate of about 30° to 70° C./hour up to 600°–1200° C. (depending on the binder) at a holding time of several hours.

The silicization is preferably carried out in vacuo. The carbon liberated from the binder and the carbon particles below 40 μm react completely here, and the surface of the coarser carbon particles, to form silicon carbide. The remaining voids are filled with molten silicon. On cooling to a temperature below the melting point of the silicon, a dense pore-free structure of silicon carbide, silicon and residual carbon (in the form of isolated particles) is formed.

By means of the process according to the invention, components of silicon-infiltrated silicon carbide can be produced which are composed of
40–95% by weight of silicon carbide,
1–45% by weight of carbon particles of a grain size between 0.1 and 500 μm and
1–25% by weight of silicon and have a porous sliding surface.

In the case of complete reaction with oxygen, the sliding surface is also free of carbon particles. In ground sections, newly formed SiC can also be seen in addition to the primary silicon carbide employed. The proportion by volume of pores in the porous surface region and especially the proportion by area corresponds to the proportion by volume of carbon particles in the interior of the component in the case of complete oxidation. Depending on the grain size of the coarse carbon particles employed, the sliding surface has pores of diameters of up to 500 μm. The maximum depth of the pores corresponds to the maximum diameter.

The carbon particles can also be removed by reaction with carbon dioxide, in accordance with the equation $$C + CO_2 \rightarrow 2CO.$$

However, this reaction proceeds considerably more slowly than the oxidation with oxygen.

The invention is explained in more detail by the examples which follow.

EXAMPLES

1. A powder mixture composed of 84% of SiC of a grain size of 1–100 μm, 5% of carbon of a grain size of 0.5–10 μm, 5% of graphite of a grain size of 1–100 μm and 6% of an aromatic resin is compacted by dry pressing. The pressing force is here selected such that a density of the component of 2.12 g/cm$^3$ results after carbonization. After machining to the final form, the component is subjected to silicization firing in vacuo, after which the component has a density of 3.06 g/cm$^3$. After the final machining, including grinding, graphite particles of a diameter of 0.1–80 μm, which have not fully reacted in the silicization process, are visible in the sliding surface. The component is then calcined in an oxygen-rich atmosphere for 5 hours at a temperature of 1200° C., the graphite particles which have been partially ground and have not fully reacted during the silicization firing, burning out of the surface. In this way, a pore structure having a pore diameter and pore depth of 0.1–80 μm can be produced in the surface. The resulting pore fraction is 3%.

2. A powder mixture composed of 74% of SiC of a grain size of 1–100 μm, 5% of carbon of a grain size of 0.5–10 μm, 15% of graphite of a grain size of 1–250 μm and 6% of an aromatic resin is processed analogously to Example 1 in such a way that, after silicization, a component having a density of 2.95 g/cm$^3$ results. After the final machining and calcination of the component in an oxygen-rich atmosphere at 1200° C. for a period of 10 hours, a pore structure having a pore diameter of 0.1–200 μm and a pore depth of 0.1–200 μm results in the surface. The pore fraction thus formed is about 12%.

3. A powder mixture composed of 60% of SiC of a grain size of 1–100 μm, 5% of carbon of a grain size of 0.5–10 μm, 30% of graphite of a grain size of 1–500 μm and 6% of an aromatic resin is processed analogously to Example 1 in such a way that, after silicization, a component having a density of 2.80 g/cm³ results. After final machining and calcination of the component in an oxygen-rich atmosphere at 1200° C. for a period of 15 hours, a pore structure having a pore diameter and pore depth of 0.1–450 µm results in the surface. The pore fraction thus formed is about 28%.

We claim:

1. A process for producing a component, having a porous sliding surface, from silicon-infiltrated silicon carbide, which comprises machining a component of silicon-infiltrated silicon carbide with
   40–95% by weight of SiC,
   1–45% by weight of carbon particles of grain size 0.1 to 500 µm and
   1–25% by weight of silicon
on parts of the surface and thus producing a sliding surface, and heating the resulting component in an oxygen-containing atmosphere at temperatures from 700° to 1410° C. until the carbon particles present in the sliding surface have been at least partially oxidized with the formation of pores.

2. The process as claimed in claim 1, wherein the calcining treatment is continued until the carbon particles present in the sliding surface have been completely oxidized.

3. The process as claimed in claim 1, which comprises forming a mixture of
   30–87% by weight of silicon carbide powder having a grain size distribution between 1 and 100 µm,
   0–10% by weight of carbon having a grain size distribution between 0.5 and 10 µm,
   5–50% by weight of carbon having a grain size distribution between 60 and 560 µm and
   5–15% by weight of an organic binder
into a blank, carbonizing the binder in a non-oxidizing atmosphere, silizing the blank between 1420° and 1700° C., a component of silicon-infiltrated silicon carbide with carbon particles of a grain size of 0.1 to 500 µm being obtained, producing a sliding surface in the component and then calcining the component in an oxygen-containing atmosphere.

4. The process as claimed in claim 3, wherein the binder has a carbonization residue of 30 to 70% by weight of carbon.

5. A component of silicon-infiltrated silicon carbide, having a porous sliding surface, which is composed of
   40–95% by weight of silicon carbide,
   1–45% by weight of carbon particles of a grain size between 0.1 and 500 µm and
   1–25% by weight of silicon,
at least 80% of the silicon carbide present being in the form of primary silicon carbide having grain sizes of 1 to 100 µm.

6. A component as claimed in claim 5, wherein the sliding surface is free of carbon particles.

7. A component as claimed in claim 6, wherein the proportion by area of pores in the porous sliding surface corresponds to the proportion by volume of carbon particles in the interior of the component.

8. A component as claimed in claim 5, wherein the sliding surface has pores of a diameter of up to 500 µm and a depth of up to 500 µm.

* * * * *